Patented Jan. 9, 1934

1,942,413

UNITED STATES PATENT OFFICE 1,942,413

VARNISH COMPOSITION AND SHELLAC SUBSTITUTE

Joseph B. Dietz, Lansdowne, and Edmund F. Oeffinger, Philadelphia, Pa., assignors to E. I. du Pont de Nemours & Company, Wilmington, Del., a corporation of Delaware No Drawing. Application February 19, 1932
Serial No. 594,143

20 Claims. (Cl. 134—26)

This invention relates to the preparation of varnish and a shellac substitute and, more particularly, relates to the use of Batu gum in the preparation of such products.

Batu gum, also known as Galla-Galla gum, belongs to the Damar family and is largely obtained from Borneo. The gum is brownish in color, quite hard and tough, and presents a stratified appearance due to the presence of layers of waxy material distributed through it. Heretofore, it has been used to some extent in the manufacture of linoleum, where it is used, not as an ingredient of a coating composition, but as a binding material in the linoleum base itself. Although its use in varnishes has been suggested, such use has been practically negligible because it is almost impossible to satisfactorily incorporate this gum with other ingredients used in varnish manufacture according to the usual procedure, the resulting varnish generally giving films which are not clear and which have a streaky appearance on drying, or in some cases, giving films which do not dry within a reasonable length of time regardless of the kind or amount of drier used. The difficulty in using this gum appears to be due to its wax content. For these reasons, although the gum is exceedingly cheap, it has never been used in any substantial amounts in the manufacture of varnish.

An object of the present invention is the preparation of a satisfactory varnish using Batu gum, which varnish will give a non-streaky film on drying and possess good drying properties. A further object is the preparation of such a varnish that may be used as a gloss varnish or may be pigmented. A still further object is the production of a low priced shellac substitute. Other objects of the invention will be apparent from the description given hereinafter.

The above objects are accomplished according to the present invention by heating Batu gum with rosin at a relatively high temperature and subsequently adding lime.

The preparation of the varnish is accomplished by heating a mixture of Batu gum with rosin to a temperature of 500–550° F., adding a relatively small amount of lime and raising the temperature to 615–665° F., allowing the temperature of the mixture to fall about 30°, then adding Chinawood oil preheated to about 300° F., subsequently raising the temperature of the mixture to 510–560° F., holding at this temperature for a short time, cooling somewhat, and then thinning the mixture with a varnish thinner.

The shellac substitute is prepared by heating a mixture of Batu gum and rosin to about 495–545° F., adding a relatively small amount of lime and raising the temperature of the mixture to 625–675° F., and then allowing the mixture to cool. The shellac substitute thus formed is dissolved in suitable solvents at room temperature.

The following examples are given to illustrate the preparation of the varnish; the parts are given by weight:—

*Example 1. Gloss rubbing varnish.*—18 parts of Batu gum and 10 parts of rosin were heated to 525° F. One part of lime was then added and the temperature raised to about 640° F., the mixture being held at this temperature until a drop of the mixture allowed to fall on glass appears homogeneous. The mixture was then allowed to cool to about 610° F. and 20 parts of Chinawood oil, preheated to about 300° F., were added, the temperature being raised to 535° F. and held there until the desired viscosity of the mixture had been obtained. The mixture was then thinned without allowing it to cool appreciably with about 50 parts of mineral spirits, and a small amount of cobalt drier was added. The resulting varnish was particularly suitable as a gloss rubbing varnish.

*Example 2. Gloss varnish not to be rubbed.*—A satisfactory gloss varnish was made by following the procedure of Example 1, but using the following proportions: 18 parts of Batu gum, 10 parts of rosin, 1 part of lime, 40 parts of Chinawood oil, and 70 parts of mineral spirits, and cobalt drier.

*Example 3. Pigmented varnish.*—Flatting agents such as zinc and aluminum stearates were incorporated in the varnish compositions of the above examples in the usual manner and gave satisfactory pigmented flats.

The above examples illustrate preferred specific embodiments of the invention, but the proportions and ingredients may be varied somewhat without departing from the spirit of this invention. The Batu gum in the above examples may be varied from 18–20 parts, the rosin from 10–20 parts, the lime from 1–2 parts, and the Chinawood oil from 20–40 parts. It will be understood, of course, that the proportion of the thinner may be varied widely and that other varnish thinners, such as turpentine and various turpentine substitutes, may be used in place of mineral spirits.

A variation in temperature of plus or minus 25° F. from the temperatures given in Example 1 may be made while still obtaining a highly satisfactory product. The length of time the mixture of Batu gum, rosin, and lime is held in the neighborhood of 640° F. is usually from 15-30 minutes, but can best be judged by observing whether a drop on glass is homogeneous. After the addition of the Chinawood oil, the temperature of the mixture is held at about 535° F. until the desired viscosity of the mixture is obtained. This is determined in the usual manner by taking samples of the mixture from time to time, thinning with the proportion of thinner which is to be used, and measuring the viscosity. This total time of cooking is usually from one hour to one-and-one-half hours.

Although it is preferred to use rosin, other resinous materials, such as fossil gums and ester gum, may be used as a flux for the Batu gum. It is also preferred to use Chinawood oil, but other drying or semi-drying oils, such as linseed oil, fish oil, and soya bean oil, may be used. Obviously the use of semi-drying oils will result in a varnish having poorer drying qualities than a varnish made as set forth in Example 1. Other varnish thinners may be employed to thin out the varnish.

The following example is given to illustrate the preparation of a shellac substitute:

*Example 4.*—16 parts of Batu gum and 8 parts of rosin were heated to about 520° F. One part of lime was then added and the temperature raised to about 650° F. The mixture was held at that temperature for approximately 10 minutes until the ingredients became homogeneously united and was then allowed to cool. The resulting product was a gum like material of high melting point and extreme hardness and friability, having quite different properties from the original Batu gum. The material was dissolved in a thinner consisting of 12.5 parts of solvent naphtha and 12.5 parts of benzine at room temperature, solution of the material being effected with agitation in somewhat over 12 hours. The resulting product constituted an excellent shellac substitute. Small amounts of organic acids may be included to improve stability.

The above example merely illustrates a preferred specific embodiment of making the shellac substitute. A variation in temperature of plus or minus 25° F. from the temperatures given in the example are permissible, and the time of heating the mixture of Batu gum, rosin, and lime may vary from 5-20 minutes. The proportions given in the example may be varied as follows:

| | Parts |
|---|---|
| Batu gum | 12.5 to 25 |
| Rosin | 6.25 to 12.5 |
| Lime | 1 to 4 |

The proportion and composition of the thinner may be varied widely, but in view of the time required to dissolve the mixture, the use of benzine or mineral spirits alone is not advisable, it being preferred to add a more active solvent, such as a coal tar naphtha, for example, solvent naphtha or high flash naphtha, to hasten the solution.

In all of the above examples lime has been disclosed to neutralize the rosin. Zinc oxide, soda ash, and other similar basic oxides, may be used in place of the lime, but lime is preferred and is markedly superior. The quantity of basic oxide should be sufficient to substantially neutralize the rosin or other resinous material used.

As many apparently widely different embodiments of this invention may be made without departing from the spirit and scope thereof, it is to be understood that the invention is not limited to the specific embodiments thereof except as defined in the appended claims.

We claim:

1. Process of preparing a coating composition comprising the steps of heating Batu gum and a resinous material from the group consisting of rosin, fossil gums, and ester gum, to about 525° F., adding a basic oxide to neutralize the resinous material, and raising the temperature of the mixture to about 650° F.

2. Process of preparing a coating composition comprising the steps of heating Batu gum and rosin to about 525° F., adding lime to neutralize the rosin, and raising the temperature of the mixture to about 650° F.

3. Process of preparing a varnish comprising heating Batu gum and a resinous material from the group consisting of rosin, fossil gums, and ester gum, to 500-550° F., adding lime to neutralize the resinous material, and raising the temperature to 615-665° F. and holding until a drop of the mixture allowed to fall on glass appears homogeneous, allowing the temperature of the mixture to fall about 30° F., adding an oil, preheated to about 300° F., from the group consisting of semi-drying and drying oils in an amount at least equal to the amount of Batu gum used, heating the mixture to 510-560° F. and holding until the desired viscosity is reached, and then thinning the mixture with a varnish thinner.

4. Process of preparing a varnish comprising heating 18-20 parts of Batu gum and 10-20 parts of a resinous material from the group consisting of rosin, fossil gums, and ester gum, to 500-550° F., adding lime to neutralize the resinous material and raising the temperature to 615-665° F. and holding until a drop of the mixture allowed to fall on glass appears homogeneous, allowing the temperature of the mixture to fall about 30° F., adding 20-40 parts of an oil, preheated to about 300° F., from the group consisting of semi-drying and drying oils, heating the mixture to 510-560° F. and holding until the desired viscosity is reached, and then thinning the mixture with a varnish thinner.

5. Process of preparing a varnish comprising heating Batu gum and rosin to 500-550° F., adding lime to neutralize the rosin and raising the temperature to 615-665° F. and holding until a drop of the mixture allowed to fall on glass appears homogeneous, allowing the temperature of the mixture to fall about 30° F., adding an oil, preheated to about 300° F., from the group consisting of semi-drying and drying oils in an amount at least equal to the amount of Batu gum used, heating the mixture to 510-560° F., and holding until the desired viscosity is reached, and then thinning the mixture with a varnish thinner.

6. Process of preparing a varnish comprising heating Batu gum and rosin to 500-550° F., adding lime to neutralize the rosin and raising the temperature to 615-665° F. and holding until a drop of the mixture allowed to fall on glass appears homogeneous, allowing the temperature of the mixture to fall about 30° F., adding 20-40 parts of an oil, preheated to about 300° F., from the group consisting of semi-drying and drying oils, heating the mixture to 510-560° F. and holding until the desired viscosity is reached, and then thinning the mixture with a varnish thinner.

7. Process of preparing a varnish comprising heating Batu gum and rosin to 500-550° F., adding lime to neutralize the rosin and raising the temperature to 615-665° F. and holding until a drop of the mixture allowed to fall on glass appears homogeneous, allowing the temperature of the mixture to fall about 30° F., adding Chinawood oil, preheated to about 300° F., in an amount at least equal to the amount of Batu gum used, heating the mixture to 510-560° F. and holding until the desired viscosity is reached, and then thinning the mixture with a varnish thinner.

8. Process of preparing a varnish comprising heating Batu gum and rosin to 500-550° F., adding lime to neutralize the rosin and raising the temperature to 615-665° F. and holding until a drop of the mixture allowed to fall on glass appears homogeneous, allowing the temperature of the mixture to fall about 30° F., adding 20-40 parts of Chinawood oil, preheated to about 300° F., heating the mixture to 510-560° F. and holding until the desired viscosity is reached, and then thinning the mixture with a varnish thinner.

9. Process of preparing a varnish comprising heating Batu gum and rosin to 500-550° F., adding 1-2 parts of lime and raising the temperature to 615-665° F. and holding until a drop of the mixture allowed to fall on glass appears homogeneous, allowing the temperature of the mixture to fall about 30° F., adding 20-40 parts of Chinawood oil, preheated to about 300° F., heating the mixture to 510-560° F. and holding until the desired viscosity is reached, and then thinning the mixture with a varnish thinner.

10. Process of preparing a varnish comprising heating about 18 parts of Batu gum and 10 parts of rosin to 525° F., adding one part of lime and raising the temperature to 640° F. and holding until a drop of the mixture allowed to fall on glass appears homogeneous, allowing the temperature to fall to 610° F., adding 20 parts of Chinawood oil, preheated to 300° F., heating the mixture to 535° F. and holding until the desired viscosity is reached, and then thinning the mixture with mineral spirits.

11. Process of preparing a shellac substitute comprising heating Batu gum and a resinous material from the group consisting of rosin, fossil gums, and ester gum, to 495-545° F., adding lime to neutralize the resinous material and raising the temperature of the mixture to 625-675° F., allowing the mixture to cool, and then thinning with a varnish thinner.

12. Process of preparing a shellac substitute comprising heating 12.5 parts of Batu gum and 6.25-12.5 parts of a resinous material from the group consisting of rosin, fossil gums, and ester gum, to 495-545° F., adding lime to neutralize the resinous material and raising the temperature to 625-675° F., allowing the mixture to cool, and then thinning with a varnish thinner.

13. Process of preparing a shellac substitute comprising heating Batu gum and rosin to 495-545° F., adding lime to neutralize the rosin and raising the temperature of the mixture to 625-675° F., allowing the mixture to cool, and then thinning with a varnish thinner.

14. Process of preparing a shellac substitute comprising heating 12.5-25 parts of Batu gum and 6.25-12.5 parts of rosin to 495-545° F., adding lime to neutralize the rosin and raising the temperature to 625-675° F., allowing the mixture to cool, and then thinning with a varnish thinner.

15. Process of preparing a shellac substitute comprising heating 12.5-25 parts of Batu gum and 6.25-12.5 parts of rosin to 495-545° F., adding lime to neutralize the rosin and raising the temperature to 625-675° F. for 5-20 minutes, allowing the mixture to cool, and then thinning with a varnish thinner.

16. Process of preparing a shellac substitute comprising heating 16 parts of Batu gum and 8 parts of rosin to 520° F., adding one part of lime and raising the temperature to 650° F. for about 10 minutes, allowing the mixture to cool, and then thinning with a varnish thinner comprising about equal parts of solvent naphtha and benzine.

17. A varnish comprising a mixture of Batu gum, rosin, sufficient lime to neutralize the rosin, and Chinawood oil, which mixture has been heated to over 500° F., dissolved in a varnish thinner.

18. A varnish comprising a mixture of 18-20 parts of Batu gum, 10-20 parts of rosin, 1-2 parts of lime, and 20-40 parts of Chinawood oil, which mixture has been heated to over 500° F., dissolved in a varnish thinner.

19. A shellac substitute comprising a mixture of Batu gum, rosin, and sufficient lime to neutralize the rosin, which mixture has been heated to over 600° F., dissolved in a varnish thinner.

20. A shellac substitute comprising a mixture of 18-20 parts of Batu gum, 10-20 parts of rosin, and 1-4 parts of lime, which mixture has been heated to over 600° F., dissolved in a varnish thinner.

EDMUND F. OEFFINGER.
JOSEPH B. DIETZ.